May 5, 1964  R. L. FEAGAN  3,131,724
FITTING
Filed July 31, 1957
2 Sheets-Sheet 2
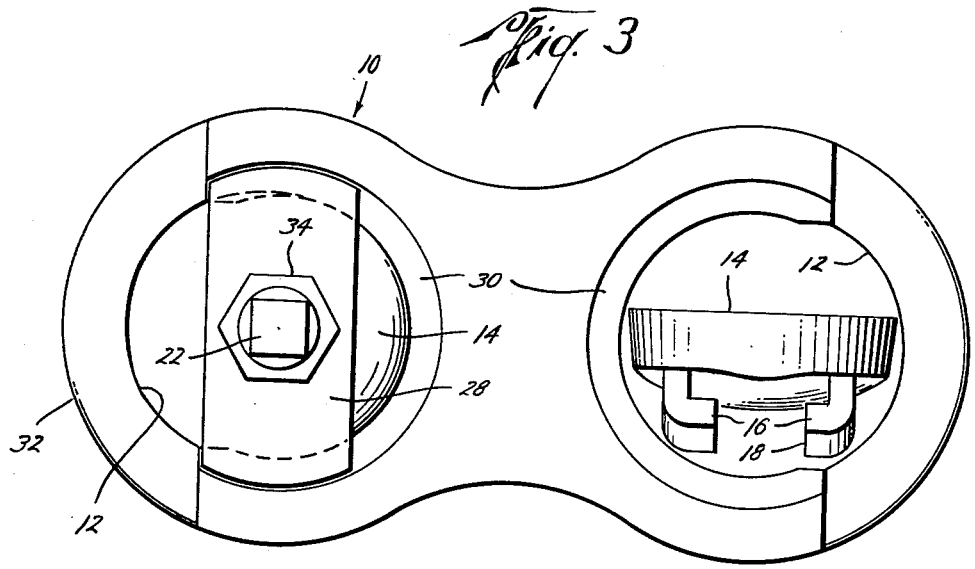
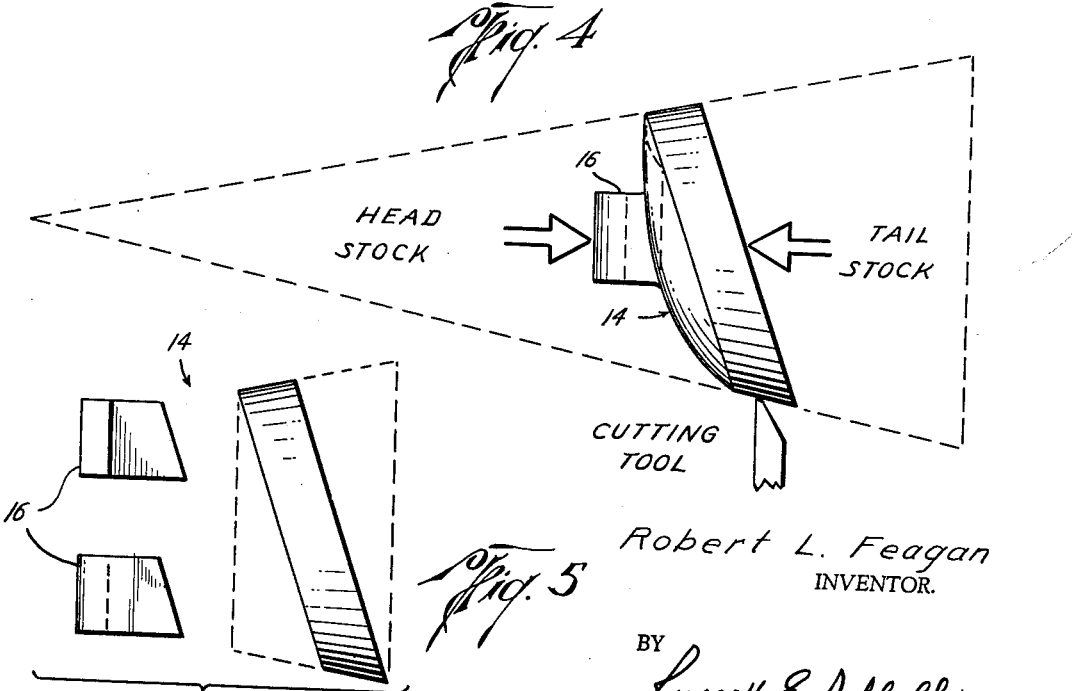
Robert L. Feagan
INVENTOR.
BY
Russell E. Schloff
ATTORNEY

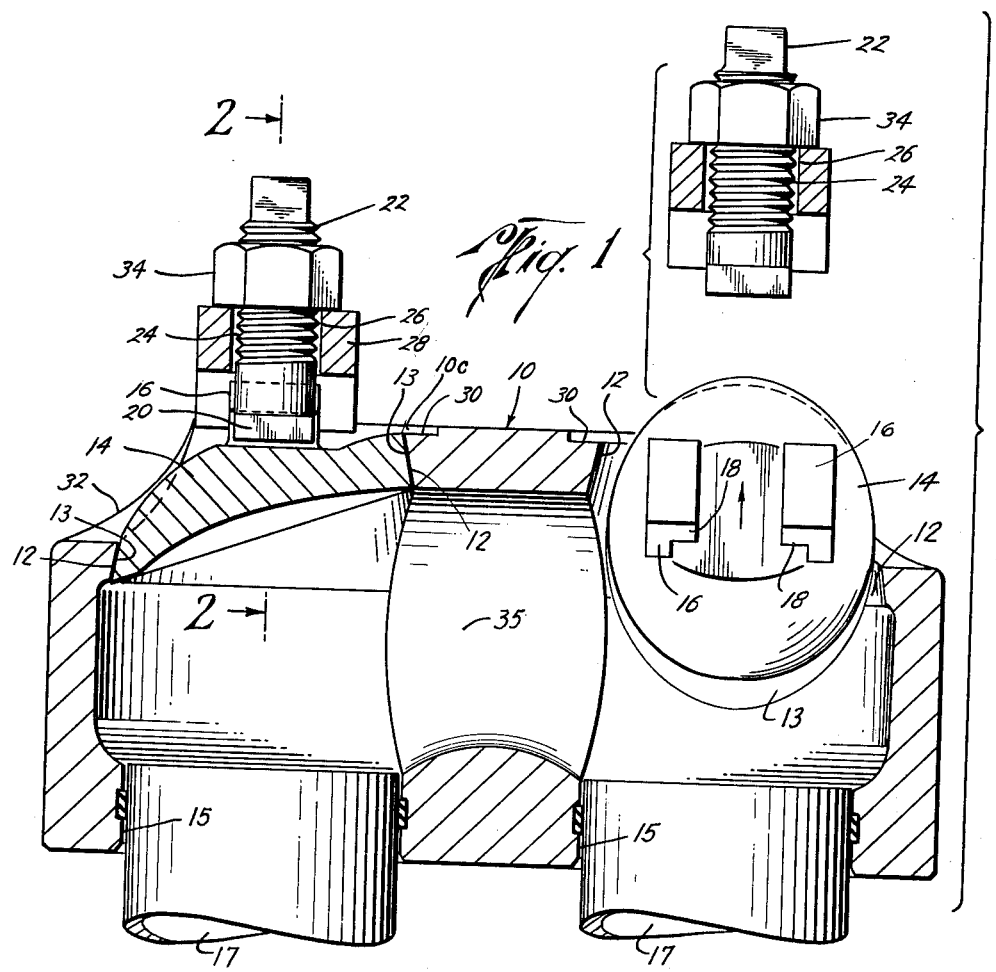
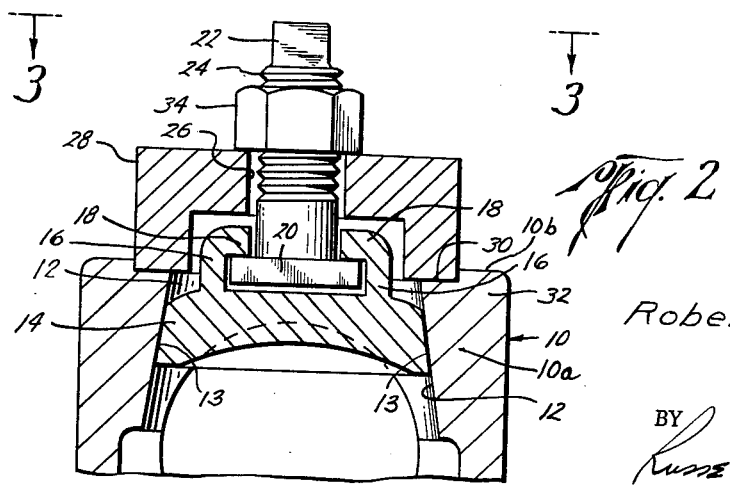

3,131,724
FITTING
Robert L. Feagan, 124 N. Chestnut, Collinsville, Ill.
Filed July 31, 1957, Ser. No. 709,720
(Filed under Rule 47(b) and 35 U.S.C. 118)
6 Claims. (Cl. 138—95)

This invention relates to a closure for sealing pressure vessels and has for its general object the provision of an improved closure construction for return bends and other special fittings subjected to internal pressure.

Conventionally, the opening for a return bend is formed into a seat which tapers inwardly toward the interior of the vessel. A similarly tapered plug is seated against this seat and is secured in position by means of external structure, which applies a load to the plug to force it against the seat. Such structure requires heavy super structure, and as the pressure inside the vessel increases, the super structure necessary also has to be increased. Also, under high temperatures and pressures, there is a tendency for the plug to be forced outwardly with the inherent leakage. In such type of construction, the plug is difficult to remove as it has to be pulled from its seat and in certain types of service the parts may have corroded together.

Another type of closure has been of the pressure sealing type, which has an outwardly tapering opening sealed by a similarly tapered but smaller plug. A seal ring is positioned between the plug and opening. However, such closures often have pockets between the inside wall and plug; wherein, if used in return bend service, coke can accumulate. Also, the seal ring is subject to corrosion. Also, this type is difficult to assemble.

An effort has been made to provide oval type, tapered plugs and openings which permits easy entry of the plug; however, these have not been very successfully practiced because of the difficulty of machining the oval surface of the plug and opening, which requires special and intricate machining. Imperfect machining has often necessitated the use of a seal ring between the plug and opening.

The present invention utilizes the easy assembly and disassembly features of elliptical type openings, but the sealing surface of the plug and opening is the surface generated by a segment of a cone which has been intersected by a pair of spaced parallel planes cutting the cone at an acute angle to base of the cone. Such structure can be machined by conventional machine tools rather than the special tooling necessary to machine an elliptical surface.

It is an object of the present invention to provide a closure for a return bend of the pressure sealing type, which is easy to insert and which may be readily removable.

It is another object of the present invention to provide an elliptical like plug and opening for a closure, the plug and opening being segments of a cone intersected by a pair of parallel planes.

It is a further object of the present invention to provide a pressure sealing type closure for a pressure vessel which is formed to eliminate any coke pockets and can be easily assembled and disassembled.

It is a still further object of the present invention to provide a method for machining a plug of the pressure sealing type, which is elliptical like in structure and which can be machined on a conventional lathe.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a cross section of a return bend utilizing the closure of the present invention, one plug being in position and the other being inserted.

FIG. 2 is a partial section taken generally along line 2—2 of FIG. 1.

FIG. 3 is a top plan view of the fitting shown in FIG. 1.

FIG. 4 is a diagrammatic view illustrating a method of machining a cast plug for the closure.

FIG. 5 is a diagrammatic view illustrating a method of fabricating a plug for the closure.

FIGS. 1, 2 and 3 disclose a return bend fitting 10 consisting primarily of a hollow tubular body having a pair of apertures 15 formed through one side of the body wall. The apertures 15 are designed for receiving tubular members 17, which comprise portions of a pressure system. In the opposite wall portions of body 10 from each aperture 15, there is formed an aperture or opening 12 into which there is closely fitted a plug 14 having a matching surface 13 coincident with the wall portion of aperture 12, when each plug 14 is inserted within a respective aperture 12. The surfaces 13 of plugs 14, as well as the matching surfaces 12 of the fitting 10, are formed by the surface of a cone intercepted between a pair of parallel planes, which intersect the axis of the cone at an acute angle thereto. This gives to the sealing surface 13 of plug 14, as well as the matching surface of each opening 12, an elliptical shape, such that each plug 12 has a configuration schematically shown on the right-hand side of FIG. 1.

The apertures 15 of the fitting 10 are cylindrical and form with the interior of the body of fitting 10 a substantially U-shaped channel 35. Furthermore, the conical surface of each aperture 12 converges outwardly of the fitting body 10 and in a manner such that the axis of the cone forming the conical surface of each aperture 12 is aligned with and passes through the aperture 12 and the aperture 15 in the opposite wall of the fitting body. The sidewall portions 10a defining the apertures 12 are relatively thick as shown in FIG. 2 with the wall thickness gradually increasing upwardly to provide relatively wide generally flat supporting surfaces 10b which are recessed as at 10c for reception of the extremities of a bridge member to be hereinafter described the top of the plug is provided with a pair of lugs 16, 16 having facing flanges 18, 18, which provide an anchor for the head 20 of a T-headed, threaded bolt member 22. The threaded portion 24 of member 22 extends outwardly from fitting 10 in alignment with respective apertures 12 and 15 and through a hole 26 in a bridge 28, which is positioned against the top 30 of the cylindrical wall 32 of the fitting 10. A nut 34 engages the threaded portion 24 of member 22 to retain the plug 12 in position.

The portion of a cone formed by a pair of spaced parallel planes intersecting the cone at an acute angle to the axis of the cone is elliptical like in outline, and has in effect a major axis and a minor axis; therefore, if the major axis of the opening 12 is greater than the minor axis of the plug 14, the plug 14 can be inserted through the opening 12 as seen in the right side of FIGS. 1 and 3. After the plug 14 has been inserted through the opening 12, it is turned to match the plane of the opening and then rotated through 90° to match the surfaces, at which time the plug 14 can be pulled outwardly and into intimate contact with the mating surface of the opening 12 as can be seen in the left side of FIG. 1. After the plug 14 is in contact with the surface of the opening 12, the T-headed member 22 is inserted into the slot formed by the flanges 18, 18, the member 22 telescoped through the hole 26 of the bridge 28 and the nut 34 threadingly engaged with the member 22. Since the bridge is positioned against the top of the wall of the fitting, as the nut 34 is tightened the plug 14 is drawn tighter against the surface of the opening 12. As pressure inside the assembled vessel increases, the sealing pressure of the closure will also increase. Since the opening can be on an angle to the main bore 35 of the fitting 10, see FIG. 1, there will be a tendency for smooth flow through the fitting, also pockets which foster accumulation of coke deposits are eliminated.

Return bend fittings and many other types of pressure vessels often are provided with an opening closed by a plug which has to be regularly removed for inspection, cleaning, etc. It is a prime requisite that the plug be readily removable and easily reassembled. In conventional return bend fittings provided with inwardly converging tapered plugs and openings, the plug is retained in position by an external structure. Such construction has two undesirable characteristics, one is that the super structure retaining the plug in position has to be of sufficient strength to retain the plug in position at maximum pressure with the result that such structure is quite heavy, expensive and cumbersome; secondly, the plug has to be pulled outwardly to be removed, which is against the most desired direction of applying force. Also, in the case of such a return bend fitting, coke may often form making it even more difficult to remove the plug. The plug 14 of the present invention is of the pressure sealing type; that is, the greater the pressure within the vessel, the tighter the plug 14 moves into intimate contact with its mating surface of the opening 12 and, therefore, tends to form a tighter seal which is in contrast to the tendency of the conventional inwardly tapered plug to decrease in sealing pressure as the pressure in the vessel increases. Having an outwardly converging tapered surface, force may be applied toward the plug 14 to dislodge it from its seat after the nut 34, bridge 28 and threaded member 22 have been removed.

The closure of the present invention not only has the advantage of being pressure sealing and easily removable, but can be formed by conventional machine tools since all the surfaces are conical and not elliptical. The sealing surface of the plug and opening, as previously described, are the surface of a segment of a cone formed by a pair of spaced parallel planes intersecting the cone at an acute angle to the axis of the cone. FIG. 4 shows diagrammatically one method of forming a plug from a casting. The surface is conical and can be machined as a regular taper or conical surface. The slot formed by the facing flanges 18, 18 can be milled in a conventional manner. If desired, the plug can be formed by fabricating it from plate stock, as shown in FIG. 5. After the plug itself has been formed into shape, the lugs 16, 16 are welded into position.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

Having thus described my invention in some detail, what I claim is:

1. A closure for a hollow pressure vessel, said pressure vessel having an aperture through the wall thereof, the aperture having an outwardly converging tapered elliptical-like seating surface, the walls defining the aperture including thickened lateral portions formed with relatively flat outer supporting surfaces, said closure comprising a plug having a continuous sealing surface defined by the surface of a cone intercepted between two parallel planes intersecting the axis of said cone at an acute angle and including a peripheral seating surface for engagement with said seating surface of said aperture, and means for retaining said plug in sealing position within said aperture, said means including a pair of laterally spaced lugs mounted generally centrally at the minor axis of said plug, each of said lugs having an inwardly facing flange portion, said lug flange portions being positioned to form a slot therebetween, a T-headed bolt removably positioned within said slot, and a removable retaining bridge element fixed to said bolt and adapted to be seated upon the lateral upper face portions of said pressure vessel on opposite sides of said aperture.

2. A closure for a hollow pressure vessel having an opening through the wall thereof defined by an outwardly converging tapered elliptical-like seating surface, said closure comprising a plug having a continuous sealing surface defined by the surface of a cone intercepted between two parallel planes intersecting the axis of said cone at an acute angle, and detachable means for retaining said plug in sealing position within said opening, said means including a pair of spaced lugs extending from the outer lateral surface of said plug, each of said lugs having an inwardly extending flange portion overlying said plug surface, said flange portions being positioned to form a slot therebetween, a T-headed bolt removably positioned within said slot and between said flange portions and said overlying plug surface, and a retaining bridge element fixed to said T-headed bolt and adapted to contact portions of said pressure vessel on opposite lateral sides of said opening.

3. A closure for hollow pressure vessel having a wall portion and an opening through said wall portion defined by an outwardly converging tapered elliptical-like seating surface, said closure comprising a plug for said opening having a continuous sealing surface defined by the surface of a cone intercepted between two parallel planes intersecting the axis of said cone at an acute angle, said vessel wall portion having a matching surface formed around the periphery of said opening, said matching wall surface being conical and converging outwardly of said vessel and having a continuous annular portion coincident with said sealing surface of said plug when said plug is positioned within said opening, and detachable means for retaining said plug in sealing position within said opening, said detachable means including a pair of spaced lugs on said plug, at opposite sides of its outer surface at its minor axis, each of said lugs having a flange portion, said lug flange portions positioned to form a T-shaped slot therebetween, a T-headed bolt removably positioned within said slot, and a retaining bridge element fixed to said bolt and contacting said vessel wall portion on opposite lateral sides of said opening.

4. A fitting for use with a pressure system, said fitting comprising a body portion having a pair of aligned apertures through opposite wall portions thereof, a closure plug for one of said apertures and having a continuous sealing surface defined by the surface of a cone intercepted between two parallel planes intersecting the axis of said cone at an acute angle, the one of said wall portions forming said one aperture having a matching surface formed around the periphery of said one aperture, said matching surface being conical and converging outwardly of said fitting and having a continuous annular portion coincident with said continuous sealing surface of said plug when said plug is positioned within said one aperture, detachable means for retaining said plug in sealing position within said one aperture, said detachable means including lug structure attached to the outer surface of said plug and having a T-shaped slot formed therein extending generally transverse of the plug at its minor axis, a T-headed bolt removably positioned within said slot and extending outwardly of said fitting in alignment with said aligned apertures, and a retaining bridge element fixed to said bolt and contacting the outer lateral surfaces of said one wall portion on opposite sides of said one aperture.

5. A fitting for use with a pressure system, said fitting comprising a hollow tubular body having at one end thereof a pair of aligned apertures through opposite wall portions, a closure plug for one of said apertures having a continuous sealing surface defined by the surface of a cone intercepted between two parallel planes intersecting the axis of said cone at an acute angle, the one of said wall portions forming said one aperture having a matching surface formed around the periphery of said one aperture, said matching wall surface being a portion of a cone whose axis passes through said aligned apertures, said conical matching wall portion converging outwardly of said body and having a continuous annular portion coincident with said sealing surface of said plug when said plug is positioned within said one aperture, detachable means for retaining said plug in sealing position within said opening, said detachable means including a pair of spaced lugs on said plug at its top portion and lying generally transversely thereof at its minor axis, each of said lugs having an inwardly extending flange portion, said flange portions positioned to form a T-shaped slot therebetween, a T-headed bolt removably positioned within said slot and extending outwardly of said fitting in alignment with said aligned apertures, and a retaining bridge element fixed to said bolt and contacting the outer surface of said one wall portion on opposite lateral sides of said one aperture.

6. A return bend fitting comprising a hollow tubular body enclosing a generally U-shaped channel, said fitting body formed with an aperture through the wall thereof at each end of said U-shaped channel, a portion of said fitting body wall opposite to one of said apertures being formed with an opening, a plug for said opening having a continuous sealing surface defined by the surface of a cone intercepted between two parallel planes intersecting the axis of said cone at an acute angle, said opposite body wall portion having a matching surface formed around the periphery of said opening, said matching wall surface being a portion of a cone whose axis is aligned with said opening and said one aperture, said conical matching wall surface converging outwardly of said body and having a continuous annular portion coincident with said sealing surface of said plug when said plug is positioned within said opening, detachable means for retaining said plug in sealing position within said opening, said detachable means including a pair of lugs on said plug, each of said lugs having a flange portion, said flange portions positioned to form a T-shaped slot therebetween, a T-headed bolt removably positioned within said slot and extending outwardly of said fitting and in alignment with said opening and said one aperture, and a retaining bridge element fixed to said bolt and contacting the lateral outer surface of said opposite body wall portion on opposite sides of said opening.

References Cited in the file of this patent
UNITED STATES PATENTS

| | | |
|---|---|---|
| 510,884 | Bradley | Dec. 19, 1893 |
| 517,885 | Pratt | Apr. 10, 1894 |
| 2,358,814 | Larsen | Sept. 26, 1944 |
| 2,453,124 | Fletcher et al. | Nov. 9, 1948 |
| 2,520,864 | Thornhill | Aug. 29, 1950 |

FOREIGN PATENTS

| | | |
|---|---|---|
| 58,450 | Germany | Aug. 27, 1891 |
| 18,674 | Great Britain | of 1892 |
| 789,421 | France | Aug. 19, 1935 |